United States Patent
Larson

(10) Patent No.: US 11,781,625 B2
(45) Date of Patent: Oct. 10, 2023

(54) SINGLE-USE NON-JAMMING STOP MODULE FOR ROTARY DRIVE ACTUATOR

(71) Applicant: MOOG INC., Elma, NY (US)

(72) Inventor: Lowell Van Lund Larson, Huntington Beach, CA (US)

(73) Assignee: Moog Inc., Elma, NY (US)

( * ) Notice: Subject to any disclaimer, the term of this patent is extended or adjusted under 35 U.S.C. 154(b) by 251 days.

(21) Appl. No.: 17/420,436

(22) PCT Filed: Feb. 24, 2020

(86) PCT No.: PCT/US2020/019406
§ 371 (c)(1),
(2) Date: Jul. 2, 2021

(87) PCT Pub. No.: WO2020/176374
PCT Pub. Date: Sep. 3, 2020

(65) Prior Publication Data
US 2022/0090663 A1   Mar. 24, 2022

Related U.S. Application Data

(60) Provisional application No. 62/810,139, filed on Feb. 25, 2019.

(51) Int. Cl.
*F16H 35/00* (2006.01)
*B64C 13/34* (2006.01)

(52) U.S. Cl.
CPC .............. *F16H 35/00* (2013.01); *B64C 13/34* (2013.01); *F16H 2035/006* (2013.01)

(58) Field of Classification Search
CPC .... F16H 2035/006; F16H 35/00; F16H 35/10; B64C 13/34
See application file for complete search history.

(56) References Cited

U.S. PATENT DOCUMENTS

| | | | |
|---|---|---|---|
| 3,651,711 A * | 3/1972 | Greenwood | ............ F16H 25/20 74/625 |
| 3,657,902 A | 4/1972 | Cataldo | |
| 5,190,503 A | 3/1993 | Russ | |
| 2003/0089826 A1 | 5/2003 | Barba | |
| 2004/0065522 A1 | 4/2004 | Gitnes et al. | |
| 2009/0298629 A1 | 12/2009 | Fujiwara | |
| 2012/0145104 A1 | 6/2012 | David et al. | |
| 2017/0158313 A1 | 6/2017 | Figeac | |
| 2019/0032722 A1 | 1/2019 | McCloy et al. | |
| 2020/0378309 A1* | 12/2020 | Beck | ....................... F16H 55/17 |

FOREIGN PATENT DOCUMENTS

| | | |
|---|---|---|
| GB | 1324991 A | 7/1973 |
| JP | H07167244 A | 7/1995 |

* cited by examiner

*Primary Examiner* — Jake Cook
(74) *Attorney, Agent, or Firm* — Hodgson Russ LLP

(57) ABSTRACT

A stop module for non-jamming end-of-stroke stoppage of a rotary drive actuator includes timing gears to articulate a stopping pawl, and a low inertia, deformable stopping disk arranged to safely dissipate excess rotational kinetic energy of the rotary actuator. The stop module does not rely on friction to stop and dissipate the excess kinetic energy, but instead relies on predictable deformation of a metallic stopping disk which may be provided in a stopping cartridge of the stop module. Use of a deformable element to dissipate excess energy allows the disclosed stop module to be lighter and smaller than conventional end-of-stroke stopping mechanisms.

12 Claims, 9 Drawing Sheets

SINGLE-USE NON-JAMMING STOP MODULE FOR ROTARY DRIVE ACTUATOR

FIELD OF THE DISCLOSURE

The present disclosure relates to a travel-limiting stop module for providing an emergency mechanical stop at an end of an actuator stroke. For example, the present disclosure may be applied, but is not limited, to geared rotary actuators (GRAs) used in actuation systems for aircraft control surfaces.

BACKGROUND OF THE DISCLOSURE

End-of-stroke stopping mechanisms, also referred to as stop modules, dissipate excess rotational kinetic energy of a rotational drive system to stop rotation when a travel limit in a given direction of travel is reached. In some applications, the excess rotational kinetic energy may be significant, and it must be dissipated very quickly. For example, a GRA in an actuation system for displacing an aircraft flight control surface may be driven by a hydraulic motor at very high revolutions per minute, and rotation must be safely stopped within a very short time span. Conventional end-of-stroke stopping mechanisms known to applicant use frictionally contacting brake plates or a torsionally compliant shaft system to dissipate excess rotational kinetic energy of the rotational drive system. These conventional stopping mechanisms are typically heavy and large in size, characteristics that are disadvantageous for aircraft applications. Some conventional stop modules are located downstream in the actuator gear train so that the stroke range is manageable, and as a result, the upstream gears are between the stop module and the motor (flywheel), and therefore have to carry the stopping torque.

SUMMARY OF THE DISCLOSURE

A stop module disclosed herein is useful for emergency over-travel rotary stop applications where jamming of the actuator at the end stop must be prevented. The disclosed stop module may employ a timing gear system to articulate a stopping pawl, and a low inertia, deformable stopping disk or other deformable element that can safely dissipate excess rotational kinetic energy of the rotating shaft system. A unique feature is that the stop module does not rely on friction to stop and dissipate the excess kinetic energy, but instead relies on predictable deformation of a metallic element (the deformable disk) which may be provided in a stopping cartridge of the stop module. Because the deformable stopping element is consumed in a high-speed stop, the stop module may be a single-use mechanism. Use of a deformable element to dissipate excess energy allows the disclosed stop module to be designed lighter and smaller than conventional end-of-stroke stopping mechanisms mentioned above.

BRIEF DESCRIPTION OF THE DRAWINGS

The nature and mode of operation of the present invention will now be more fully described in the following detailed description taken with the accompanying drawing figures, in which.

DETAILED DESCRIPTION OF THE DISCLOSURE

Figure 1:
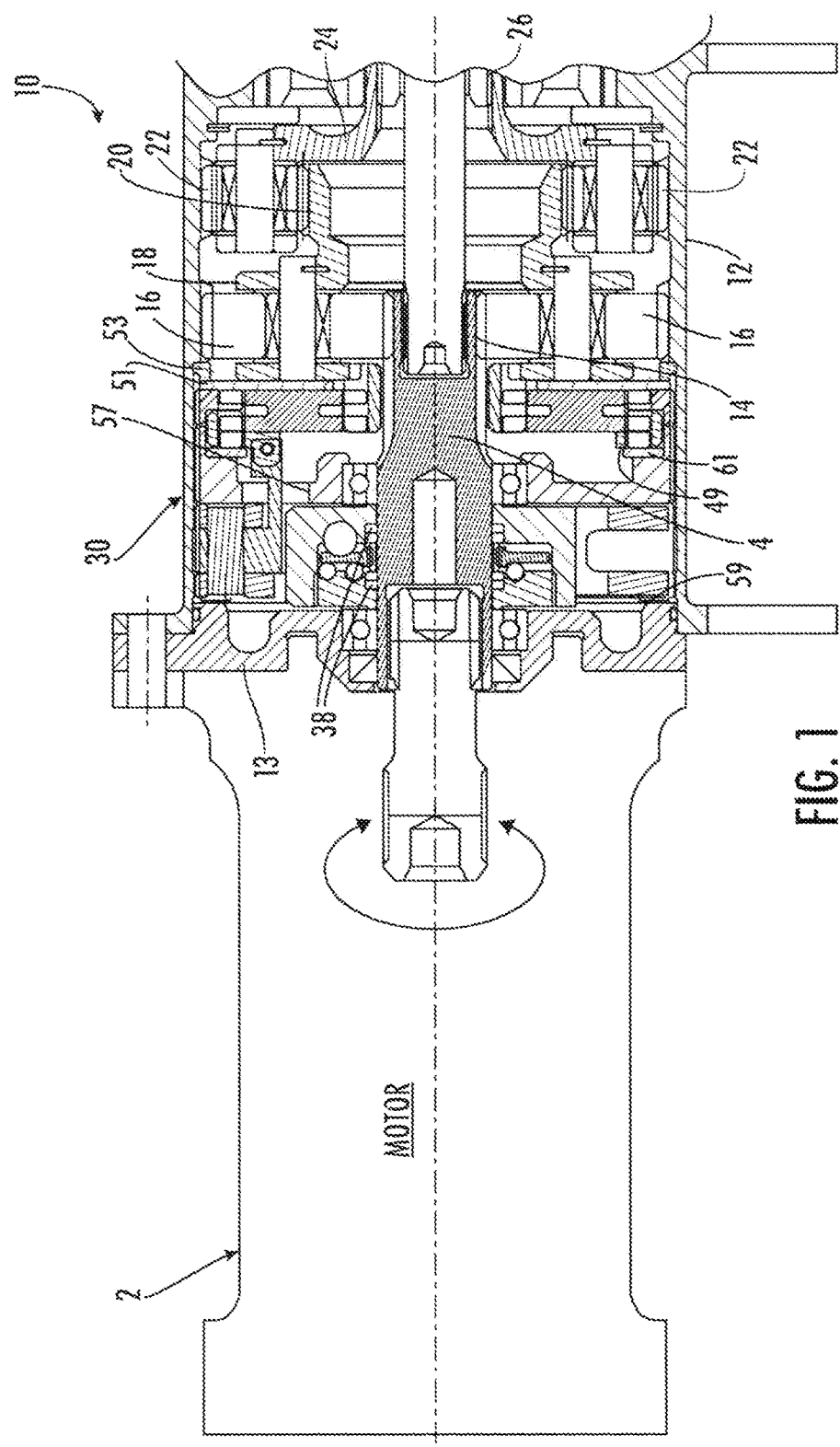
FIG. 1 is a cross-sectional view of a rotational drive system in which a motor drives a GRA equipped with a stop module of the present disclosure.

FIG. 1 shows a motor 2 connected to a GRA 10. Motor 2 may be any type of motor, for example a hydraulic motor, an electric motor, or a pneumatic motor. Motor 2 is operable to rotatably drive an input shaft 4 transmitting a rotational input to GRA 10. Input shaft 4 may be supported for rotation about its axis by a pair of rotary bearings 15. GRA 10 is configured to include a stop module 30 described in detail below.

An end portion of input shaft 4 may have external gear teeth to act as a sun gear 14 of a first planetary gear stage of GRA 10. Sun gear 14 meshes with a first set of planet gears 16, which in turn are meshed with internal gear teeth in housing 12 such that housing 12 acts as a ring gear for the first planetary gear stage. A first stage carrier 18 is coupled to planet gears 16 and is driven to rotate about the axis of input shaft 4 upon rotation of the input shaft. An end portion of first stage carrier 18 may have external gear teeth to act as a sun gear 20 of a second planetary gear stage of GRA 10. The second planetary gear stage further includes a second set of planet gears 22 meshed with sun gear 20 and with internal gear teeth in housing 12 forming another ring gear. A second stage carrier 24 is coupled to planet gears 22 and is driven to rotate about the axis of input shaft 4 upon rotation of the input shaft and first stage carrier 18. Second stage carrier 24 may include an output spline 26 for connection to a load (not shown). An end cover 13 may be fastened to housing 12.

Figure 2:
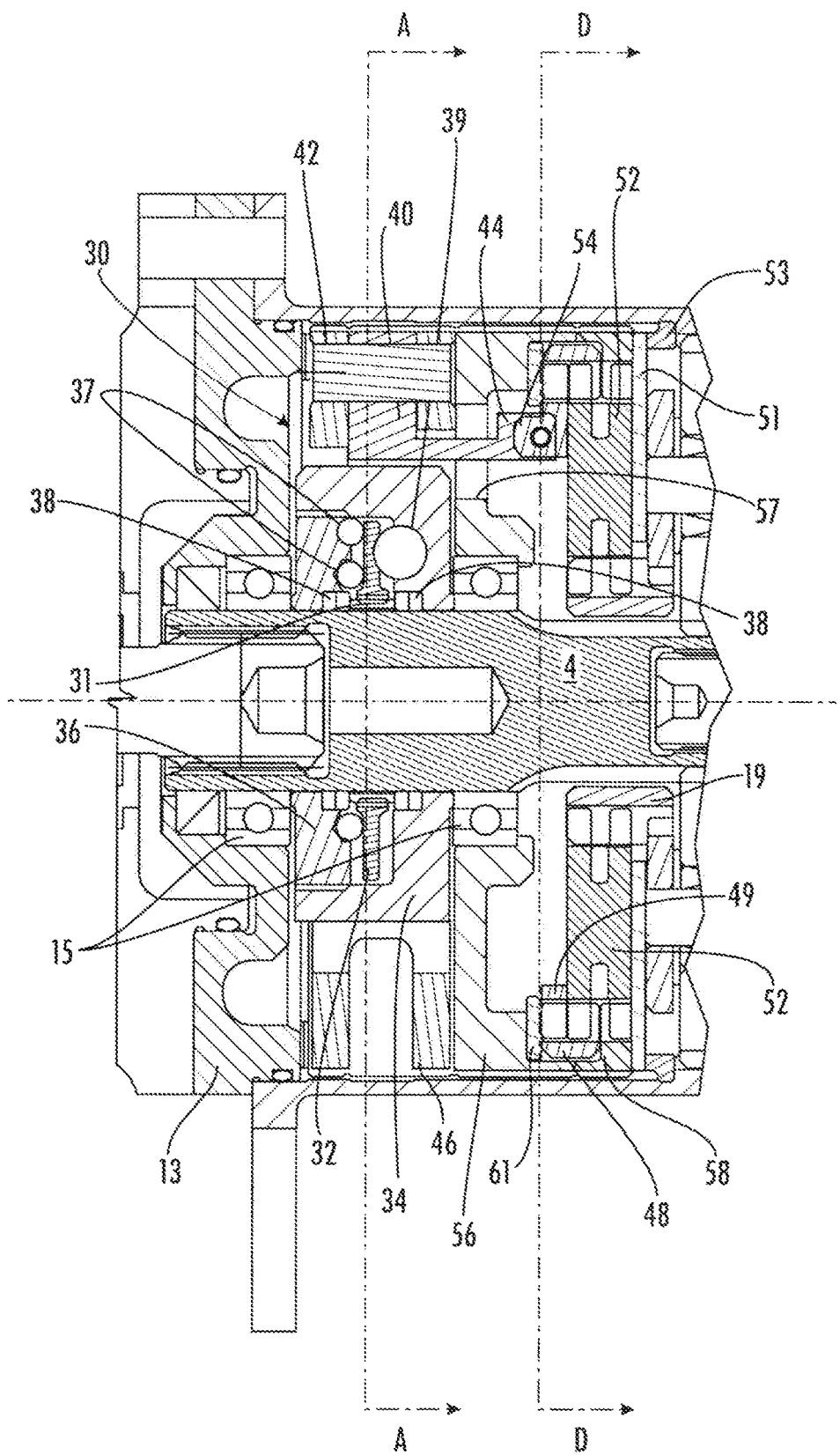
FIG. 2 is an enlarged cross-sectional view showing the GRA of FIG. 1 having the disclosed stop module.
Figure 3:
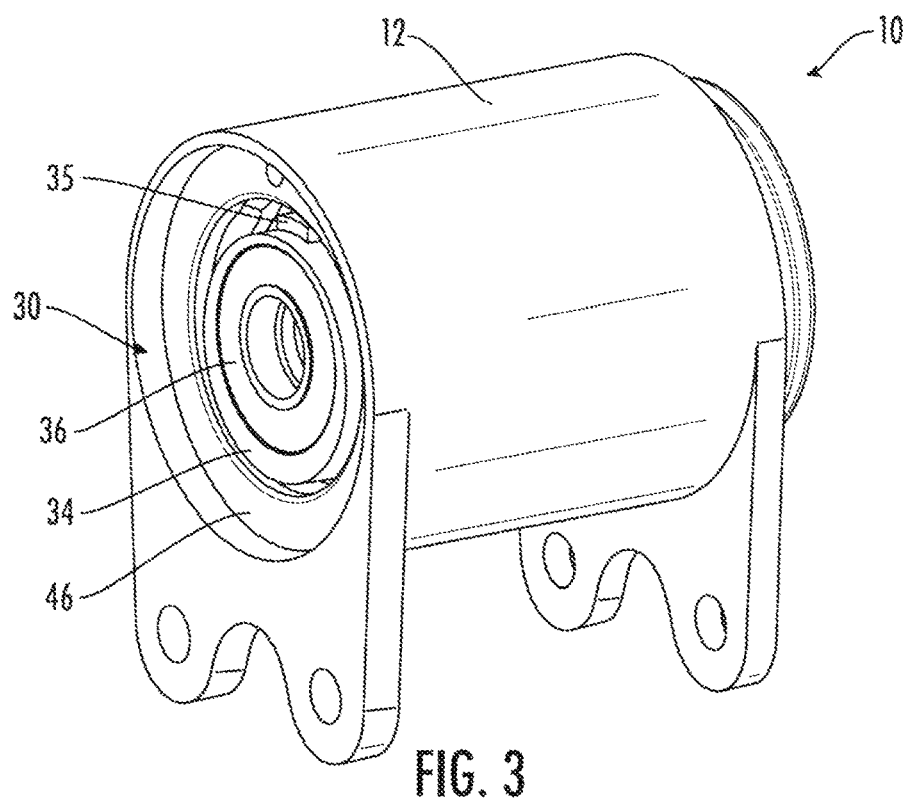
FIG. 3 is a perspective view of the GRA having the disclosed stop module.
Figure 4:
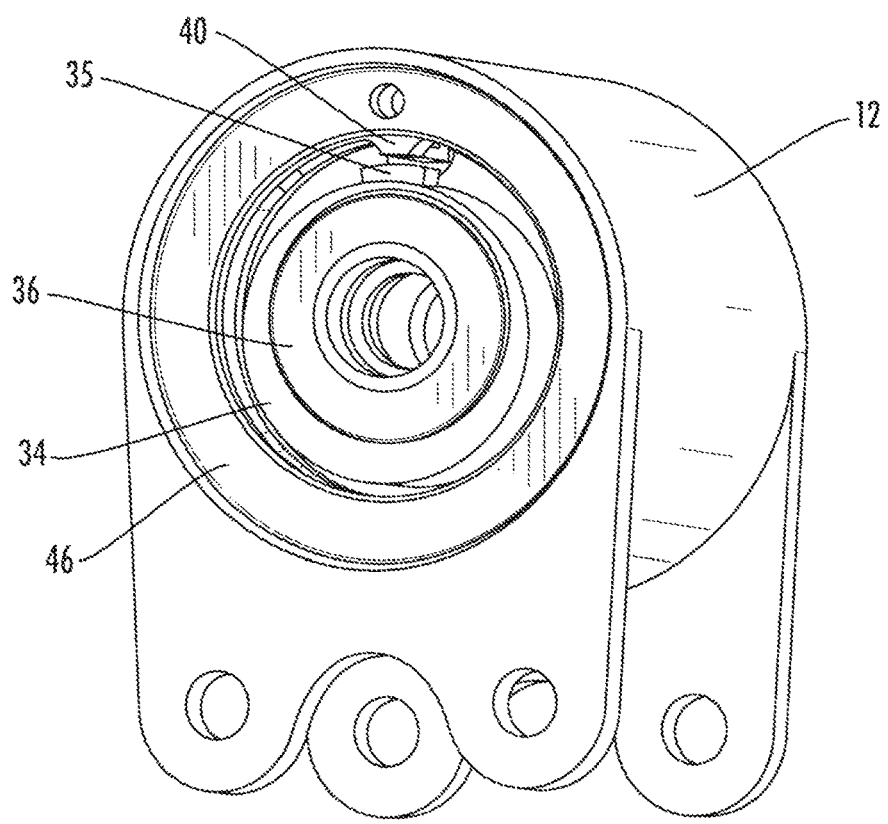
FIG. 4 is another perspective view of the GRA having the disclosed stop module.
Figure 5:
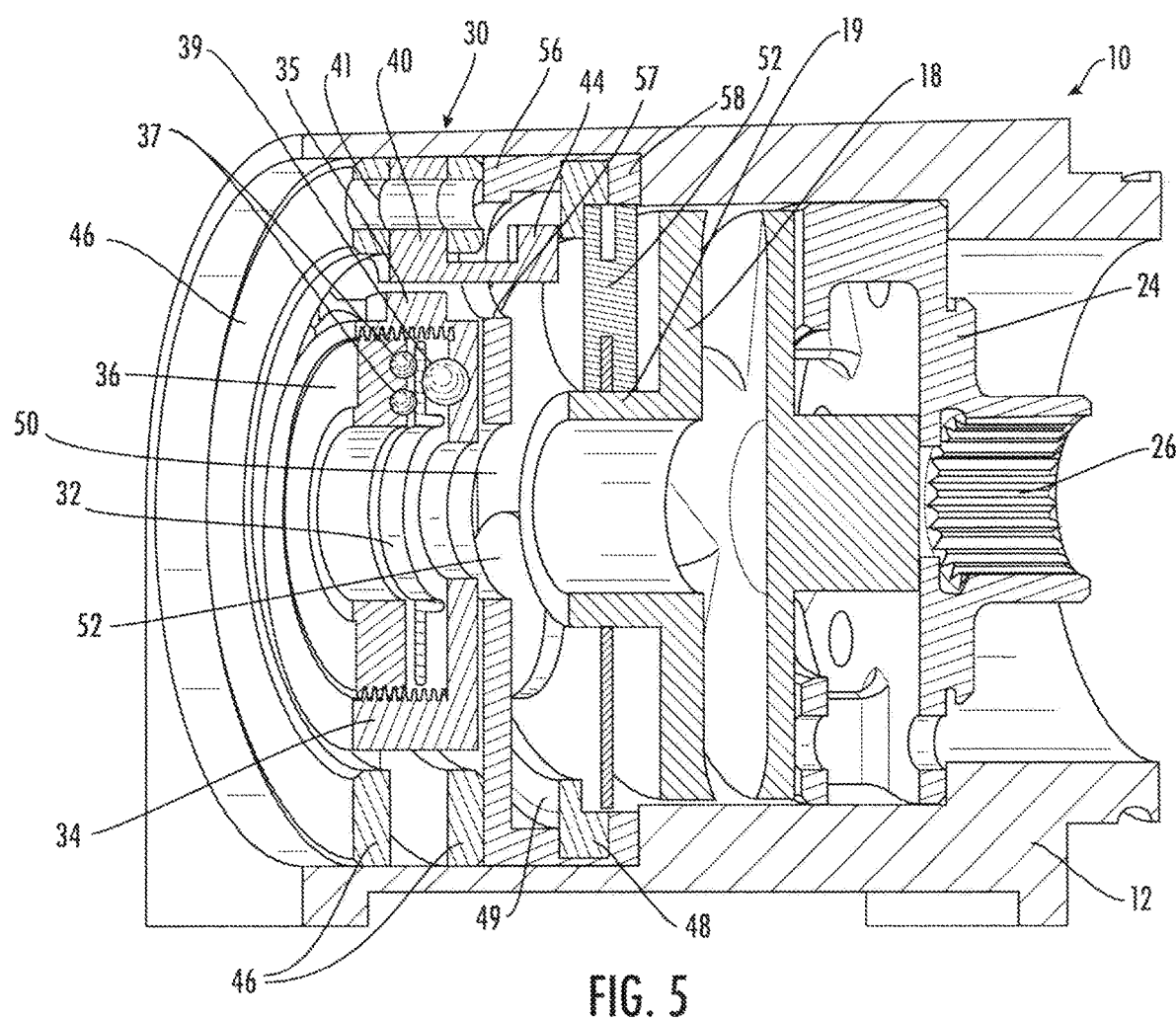
FIG. 5 is a sectioned perspective view of the GRA having the disclosed stop module, wherein planetary gears of the GRA gear stages are not shown for sake of clarity.
Figure 6:
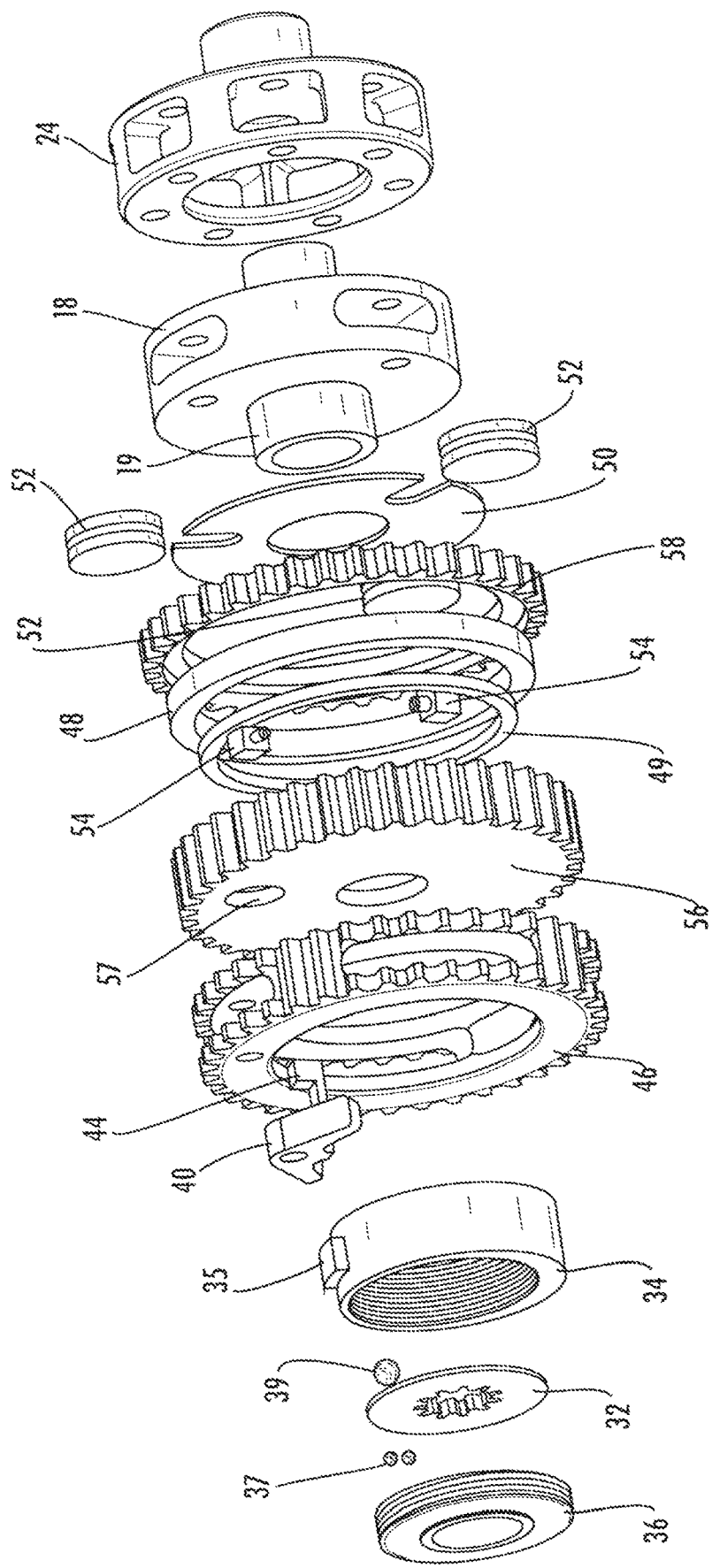
FIG. 6 is an exploded perspective view showing internal components of the stop module and GRA, wherein planetary gears of the GRA gear stages are not shown for sake of clarity.
Figure 7:
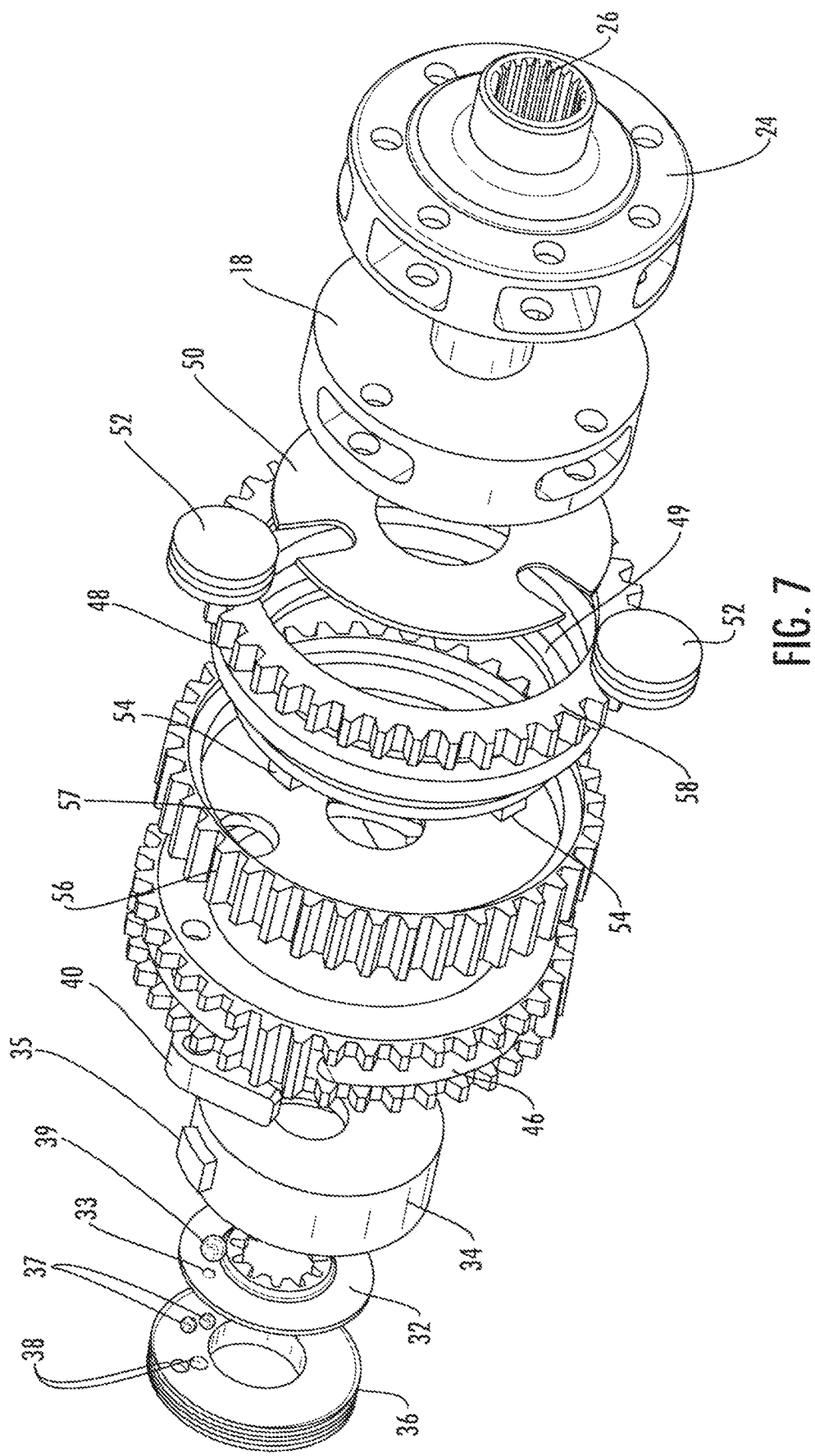
FIG. 7 is another exploded perspective view showing internal components of the stop module and GRA, wherein planetary gears of the GRA gear stages are not shown for sake of clarity.

Referring also now to FIG. 2, stop module 30 of the present disclosure uses a timing gear system based on first stage carrier 18 to trigger deformation of a deformable disk 32 to dissipate excess kinetic energy. Deformable disk 32 may be contained within a stopping cartridge assembly formed by a first part 34 and a second part 36. Cartridge assembly parts 34 and 36 may be threaded together and locked together by a pin (not shown). Deformable disk 32 is shown squeezed between hard (i.e. rigid) deforming elements, for example, balls 37 and 39 that are constrained in the stopping cartridge assembly. Balls 37 and 39 may normally be seated within internal pockets (not labelled but visible in FIG. 2) in second part 36 and first part 34, respectively. Ball 39 may normally occupy a recess 33 (see FIG. 7) in deformable disk 32. In the depicted embodiment, the deforming elements are shaped as spherical balls, however the deforming elements may be rigid bodies having a non-spherical shape.

Figure 8:
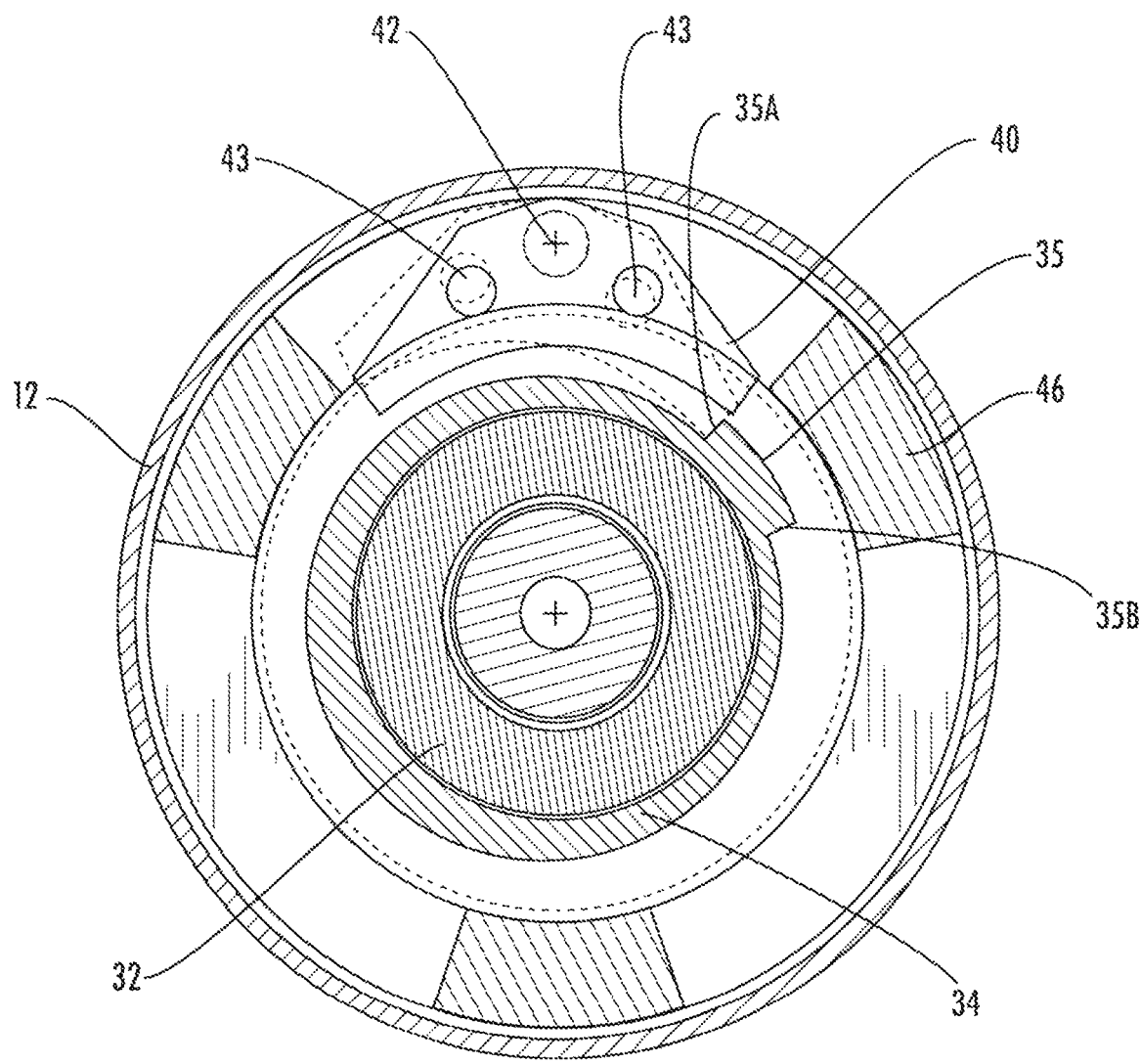
FIG. 8 is a partial sectional view taken generally along the line A-A in FIG. 2.
Figure 9:
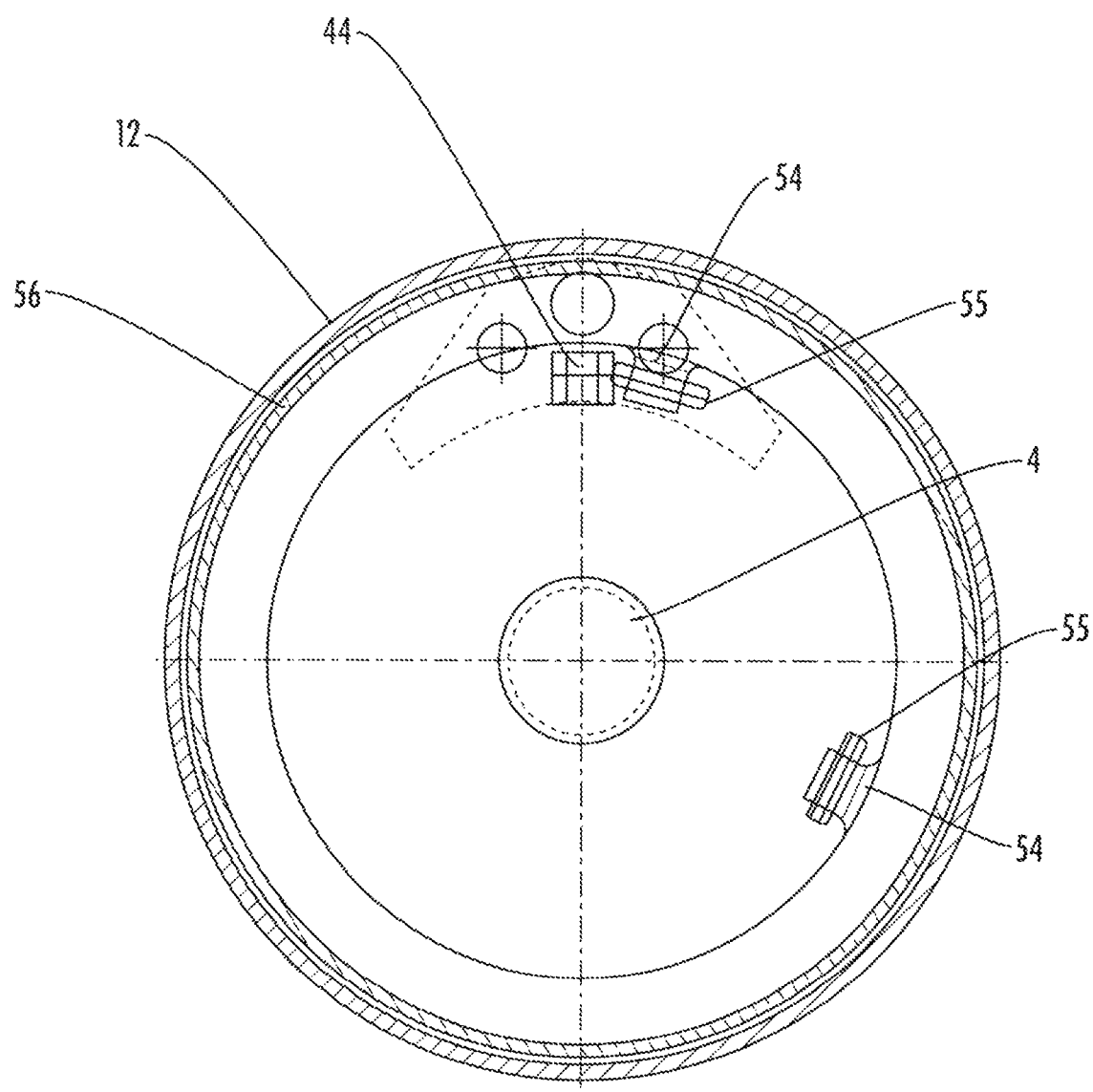
FIG. 9 is a partial sectional view taken generally along the line D-D in FIG. 2, with a stopping pawl of the stopping module also being shown in dotted line.

Deformable disk 32 may be splined onto input shaft 4 so as to rotate with the input shaft. The cartridge assembly parts 34 and 36 are free to rotate relative to input shaft 4 about the axis of input shaft 4, but will normally rotate with input shaft 4 and deformable disk 32 due to the constraint of deformable disk 32 within the stopping cartridge assembly. Thrust bearings 38 may be arranged to hold deformable disk 32 splined on part 4 to prevent axial movement of the splines and cartridge assembly parts 34 and 36 between bearings 15. First part 34 of the stopping cartridge assembly may include an external protrusion 35 defining a pair of radial faces 35A and 35B (see FIG. 8).

Attention is also directed now to the remaining FIGS. 3-11 in addition to FIGS. 1 and 2. The timing gear system mentioned above may be enclosed by an internal housing comprising parts 56 and 58. Internal housing 56, 58 may mount on one of the input shaft reaction bearings 15, and may be externally splined to an internal splined surface of housing 12. First stage carrier 18 may include a hub portion 19 having external gear teeth meshing with planet gears 52 rotatably mounted on a support plate 50. Planet gears 52 may be bifurcated to mesh on one side with internal ring gear teeth provided in internal housing part 58, and on the other side with a timing ring gear 48 which carries a tang ring 49. Rotation of first stage carrier 18 caused by rotation of input shaft 4 is transmitted to planet gears 52, thereby causing rotation of timing ring gear 48 and tang ring 49 about the axis of input shaft 4. Tang ring 49 may include one or more of angularly spaced tangs 54, and each tang 54 may have a corresponding set screw 55. While the drawings show tang ring 49 as a toothed plate which fits tightly into ring gear 48, tang ring 49 may be provided as a plate welded to ring gear 48 and then ground flush with the ring gear.

A hardened spacer 53 abutting with a radial step in housing 12, and a hardened washer 51 engaging the spacer 53, may be arranged between first stage carrier 18 and internal housing part 58. A hardened washer 61 may be provided between internal housing part 56 and ring gear 48 such that ring gear 48 is allowed to rotate.

A stopping pawl 40 may be arranged outside internal housing 56, 58 and may be pivotable about an axis of a pivot pin 42 for engaging one of the radially extending faces 35A or 35B of protrusion 35 depending upon the pivot direction. Pivot pin 42 may be seated within aligned openings 41 though pawl 40 and through a ring-shaped keeper 46 fixed within housing 12. Under normal operation (i.e. not at an emergency limit stop condition), stopping pawl 40 remains in a centered pivot position about the axis of pivot pin 42 and does not impede rotation of the stopping cartridge assembly. Pawl 40 may be biased to occupy the centered pivot position by a pair of spring-loaded ball detents (not shown) engageable with recesses 43 in pawl 40 to center pawl 40 when the pawl is not pivoted to a tipped position at an end of stroke, as described below. Pawl 40 is shown as having an extension arranged to extend through a passage 57 in internal housing part 56 and terminating at an actuation end 44. Shims (not labelled) may be arranged between end cover 13 and keeper 46 to axially constrain keeper 46 and internal housing 56, 58 within external housing 12.

Figure 10:
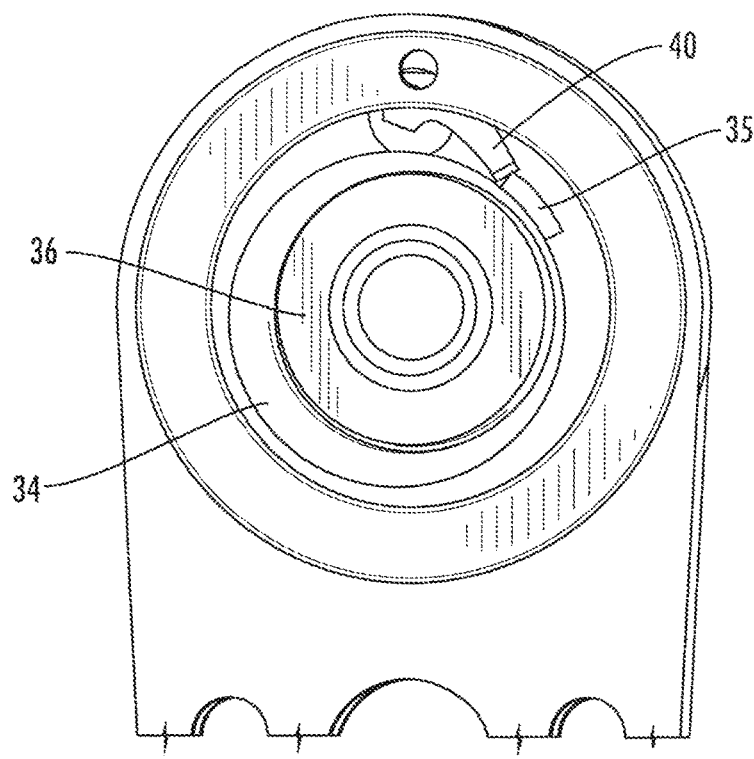
FIG. 10 is an end view of the stop module showing pivoted engagement of the stopping pawl of the stop module.
Figure 11:
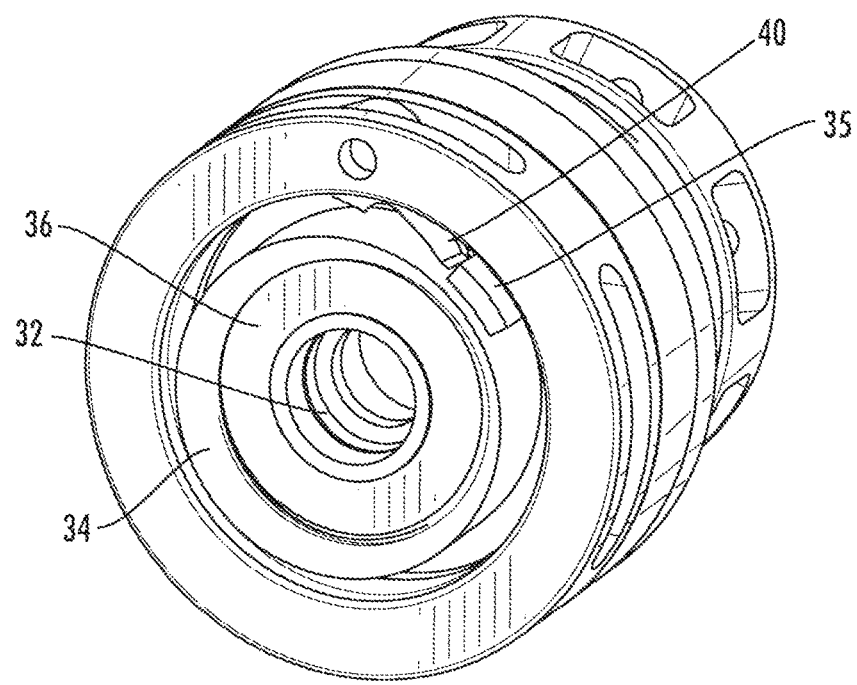
FIG. 11 is a simplified perspective view of internal components of the stop module showing pivoted engagement of the stopping pawl.

The timing gear system is designed so that timing ring gear 48 and tang ring 49 rotate slowly through less than one complete revolution during the actuator stroke. The timing gear system and angular spacing of tangs 54 may be configured such that a set screw 55 on one of the tangs 54 engages actuation end 44 of pawl 40 at the end of stroke or over-travel position of the actuator to pivot pawl 40 about the axis of pivot pin 42. When pawl 40 is pivoted, as illustrated in FIGS. 10 and 11, it engages one of the radial faces 35A or 35B of protrusion 35, thereby preventing first part 34 and second part 36 of the stopping cartridge assembly from rotating with input shaft 4 and deformable disk 32. The system may be bidirectional, wherein the set screw 55 on a different tang 54 engages the actuation end 44 of pawl 40 when input shaft 4 rotates in an opposite direction, thereby pivoting pawl 40 in an opposite direction to engage the other radial face 35B or 35A of protrusion 35. As will be understood by those skilled in the art, the configuration of the timing gear system is subject to design options. By way of non-limiting examples, a Geneva mechanism or similar timing mechanism may be used in place of the illustrated timing gear system and is considered to be within the scope of this disclosure.

When pivoting of pawl 40 prevents first part 34 and second part 36 of the stopping cartridge assembly from rotating with input shaft 4 and deformable disk 32, balls 37 and 39 cause deformation of deformable disk 32. The balls remain in the internal pockets in first part 34 and second part 36, and permanently deform disk 32 to dissipate kinetic energy as the disk 32 continues to rotate relative to balls 37, 39 until rotation of disk 32 and input shaft 4 is stopped. The torque generated by the deforming balls 37, 39 reacts a side load through the two radial bearings 15.

As will be appreciated, pawl 40 is only pivoted from its centered position when the mechanical stroke of the actuator is exceeded, and once the motor has stopped and is reversed to back up into the normal stroke range of the actuator, the pawl 40 pivots back to its centered position with no drag at all, i.e. the system is non-jamming.

In a modified embodiment, two or more stopping pawls 40 and corresponding protrusions 35 may be provided and arranged so as to eliminate the momentary side load generated by the stopping pawl on bearings 15. For the example, a pair of pawls 40 and a pair of protrusions 35 may be arranged 180 degrees apart about the rotational axis of input shaft 4, thereby cancelling any side load due to stopping torque.

While one set of deforming elements 37, 39 is shown for permanently deforming disk 32, another set of deforming elements may be arranged and configured to dissipate more rotational kinetic energy from the system by straightening out the deformed regions of disk 32 (e.g. bumps or ridges formed by the first set of deforming elements 37, 39) as the disk continues to rotate while coming to a stop. For example, one or more secondary deforming elements may be angularly spaced from the first set of deforming elements 37, 39 about the rotational axis of input shaft 4 to act on and flatten the previously deformed regions as deformable disk 32 continues to rotate while coming to a stop.

In the depicted embodiment, the deformable element is shown as a disk 32. However, the shape of the deformable element may be other than a disk shape. For example, and without limiting the disclosure, the deformable element may have a cylindrical shape. The deformable element may be formed as a separate element as described above, or it may be integrally formed with one of the constituent parts 34 or 36 of the cartridge assembly.

The single-use stop module of the present disclosure eliminates significant weight, size, torque drag, and inertia compared to conventional stop modules. The disclosed single-use stop module is about one-fifth the weight of a conventional stop module, is much shorter in an axial direction than a conventional stop module, involves no drag and has no brake plates, and has about one-fifth the rotational inertia of one motor. The stop module stops the motor before any load carrying gears in the actuator gear train are loaded, which is an advantage over some conventional stop modules placed downstream in the actuator gear train. The consumed one-time only emergency stopping cartridge assembly may be overhauled or replaced after a rare end-of-stroke runaway condition occurs.

While the disclosure describes exemplary embodiments, the detailed description is not intended to limit the scope of the claimed invention to the particular forms set forth. The specification is intended to cover such alternatives, modifications and equivalents of the described embodiment as may be apparent to one of ordinary skill in the art.

What is claimed is:

1. An actuator for transmitting rotary motion from an input element to an output element, the actuator having an end-of-stroke limit, wherein the actuator comprises:
   a deformable element and a deforming element, wherein the deformable element is connected to the input element such that the deformable element rotates in response to rotation of the input element;
   a stopping element movable between a non-stopping position and a stopping position, wherein the deforming element rotates with the deformable element when the stopping element is in the non-stopping position, and wherein relative motion occurs between the deformable element and the deforming element when the stopping element is in the stopping position; and
   a timing gear responsive to rotation of the input element or the output element, wherein the timing gear is configured to move the stopping element to the stopping position when the end-of-stroke limit is reached;
   wherein the deforming element causes deformation of the deformable element when relative motion occurs between the deformable element and the deforming element;
   whereby kinetic energy in the actuator is dissipated through the deformation of the deformable element when the end-of-stroke limit is reached.

2. The actuator according to claim 1, wherein the actuator comprises a stopping cartridge assembly including an enclosure, and wherein the deformable element and the deforming element are located within the enclosure, wherein the enclosure, the deformable element, and the deforming element rotate together as a unit when the stopping element is in the non-stopping position.

3. The actuator according to claim 2, wherein the deformable element is a deformable disk made of metal.

4. The actuator according to claim 3, wherein the deformable disk is splined onto the input element so as to rotate with the input element.

5. The actuator according to claim 3, wherein the deforming element includes at least one ball contacting the enclosure and the deformable disk.

6. The actuator according to claim 5, wherein the at least one ball includes a plurality of balls seated in respective pockets in an interior surface of the enclosure and arranged in contact with the deformable disk.

7. The actuator according to claim 6, wherein the deformable disk includes a recess receiving one of the plurality of balls.

8. The actuator according to claim 5, wherein the stopping element engages the enclosure in the stopping position, thereby causing relative motion to occur between the deformable disk and the at least one ball.

9. The actuator according to claim 2, wherein the stopping element includes a pawl pivotable about an axis between the non-stopping position and the stopping position, wherein the pawl engages the enclosure in the stopping position thereby causing relative motion to occur between the deformable element and the deforming element.

10. The actuator according to claim 9, wherein the end-of-stroke limit of the actuator is a first end-of-stroke limit corresponding to a first rotational direction of the input element, and the actuator has a second end-of-stroke limit corresponding to a second rotational direction of the input element, wherein the pawl is pivotable about the axis in a first direction from the non-stopping position to a first stopping position in which the pawl engages the enclosure to stop the enclosure when the enclosure is rotating in a first direction, and the pawl is pivotable about the axis in a second direction from the non-stopping position to a second stopping position in which the pawl engages the enclosure to stop the enclosure when the enclosure is rotating in a second direction.

11. The actuator according to claim 9, wherein the pawl is biased to the non-stopping position when the actuator is between the first end-of-stroke limit and the second end-of-stroke limit.

12. The actuator according to claim 1, further comprising a secondary deforming element angularly spaced from the deforming element about an axis of rotation of the input element, wherein the secondary deforming element acts upon a region of the deformable element previously deformed by the deforming element.

* * * * *